UNITED STATES PATENT OFFICE.

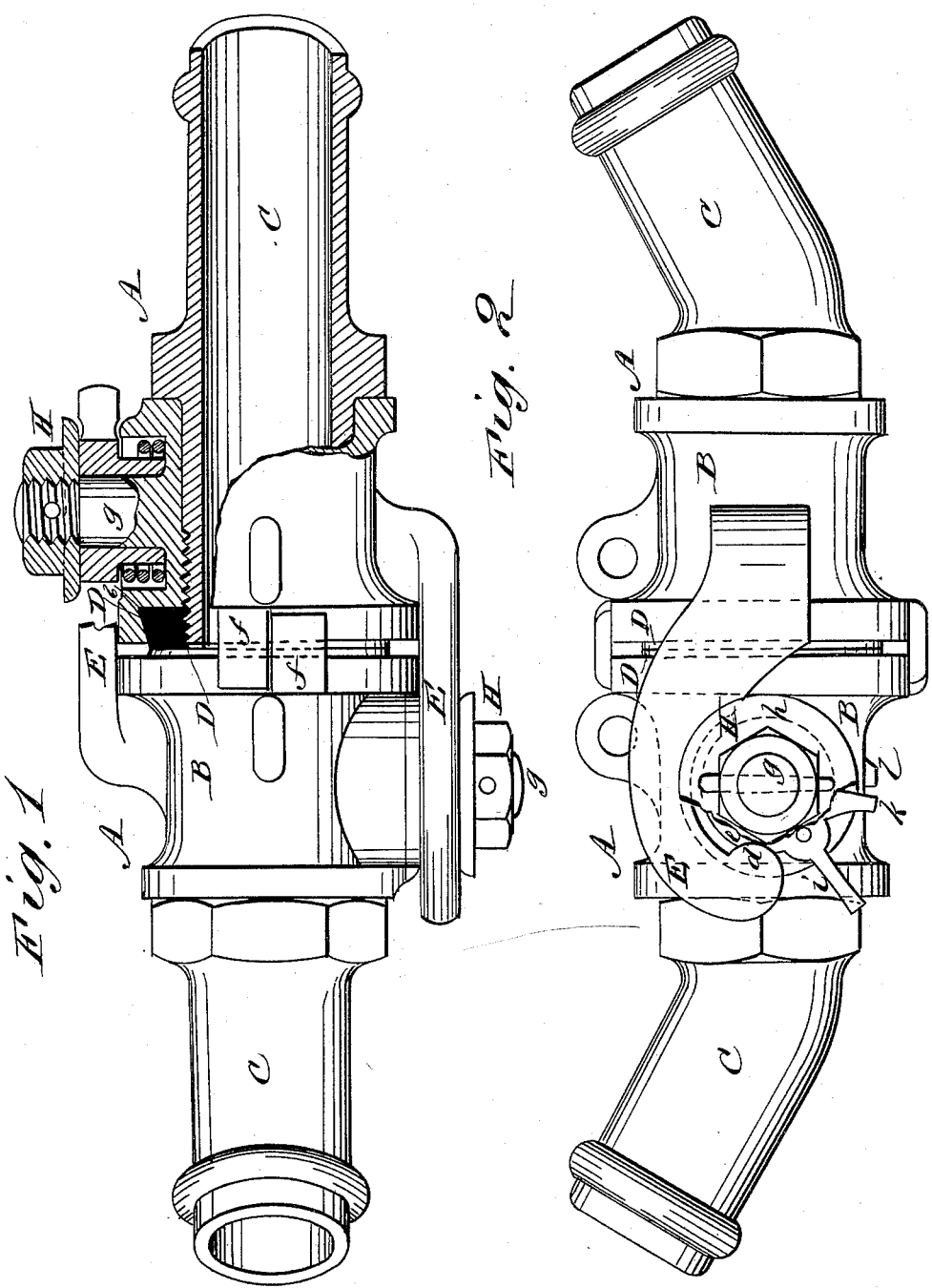

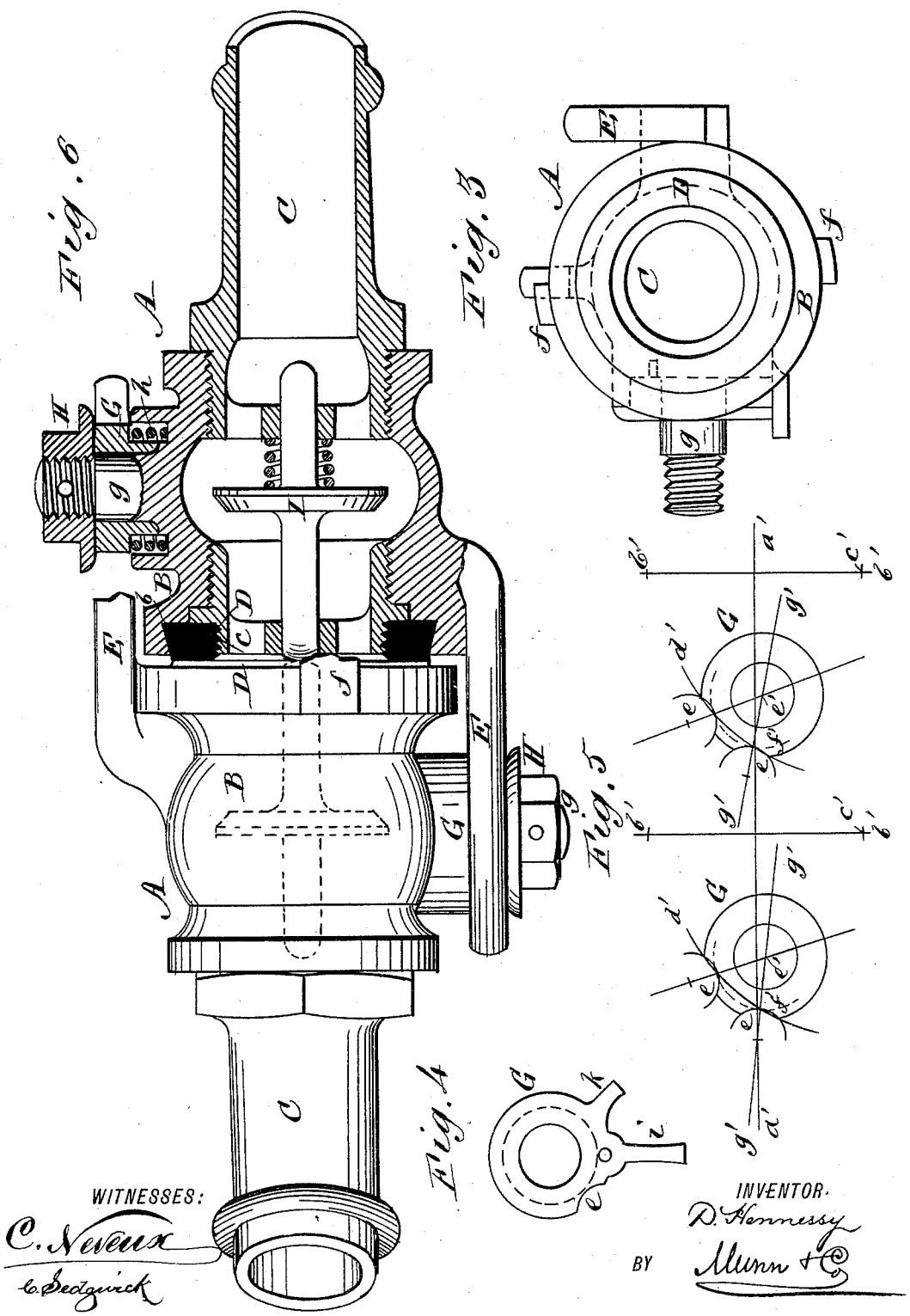

DAVID HENNESSY, OF NEW YORK, N. Y.

HOSE-PIPE COUPLING FOR RAILWAY-CARS.

SPECIFICATION forming part of Letters Patent No. 397,645, dated February 12, 1889.

Application filed June 1, 1888. Serial No. 275,695. (No model.)

*To all whom it may concern:*

Be it known that I, DAVID HENNESSY, of the city, county, and State of New York, have invented a new and useful Improvement in Hose-Pipe Couplings for Railroad-Cars, of which the following is a full, clear, and exact description.

This invention relates to hose-pipe couplings for railroad cars, also applicable to hose-pipe couplings for other purposes, but more particularly intended for railroad-cars, to form a continuous pipe-connection throughout a train or series of cars for the transmission of various fluids, vapors, or gases, including steam, compressed air, water, lighting fluids or vapors, and air at reduced pressure to operate as a void or vacuum, according to the purpose the same are designed to serve, such as heating or lighting the cars, applying the brakes, and other purposes or uses; and the invention will here be described more especially with reference to such application of the coupling.

The invention consists in a hooking and unhooking hose-pipe coupling of special and peculiar construction, substantially as hereinafter described, and pointed out in the claims, and which not only admits of being readily fastened and unfastened when required, is or may be automatic in its closing action, and forms a perfect closing joint and secure lock, but as applied to railroad-cars readily admits of the coupling unfastening itself in case of the derailment of a car or breaking up of the train.

Reference is to be had to the accompanying drawings, forming a part of this specification, in which similar letters of reference indicate corresponding parts in all the figures.

Figure 1 represents a partly-sectional plan of a hose-pipe coupling embodying my invention, and Fig. 2 a side view of the same. Fig. 3 is a face end view of one of the coupling-sections in part; Fig. 4, an outer face view of a rotatable locking device on each coupling-section, and with which a hook-shaped arm on the other coupling-section engages, and Fig. 5 a diagram illustrating the engaging and disengaging action of the coupling. Fig. 6 is a plan view of the coupling, showing its one-half or section mainly in section, also showing the coupling as fitted with self-acting valves to prevent escape of the fluid, vapor, or gas passing through it in case of the disengaging or breaking loose of the coupling.

A A indicate the two half-couplings or coupling sections, which are or may be both made alike, excepting that the engaging and locking devices are on opposite sides of the two coupling-sections, respectively. Thus each half-coupling or coupling-section A is made with a tubular head or body portion, B, into which is screwed a pipe, C, extending beyond the back end of said body part, which extended portion is preferably bent upward, and is constructed to provide for the attachment of the hose to be coupled. The meeting or face end of each coupling head or body B is made with a locking or dovetail-shaped recess, *b*, to hold within it an india-rubber or other like soft elastic ring, D, which projects slightly beyond the meeting or face end of the half-coupling, to form, when the whole coupling is closed, a close joint with a similar ring, D, on the face end of the other half-coupling. Each of these packings or rings D is further secured in place substantially as shown in Fig. 1, which represents the forward screw-threaded portion, *c*, of the pipe C, that unites said pipe with the body part B, as extended and screwing into the interior peripheral portion of the elastic ring D.

In Fig. 6 substantially the same method is shown of securing the ring D by a screw-thread on a pipe-like fitting within the body portion B; but here said pipe-like fitting, which has the screw-thread *c* on it, is a separate or divided forward portion of the pipe C, as necessary or desirable when a check-valve is used within the head or body portion B.

Each head or body portion B is provided with a hook-like attached side arm, E, arranged to project beyond the face end of it and terminating in an outer protuberance or rounded nose, *d*, which, when the two half-couplings are engaged, fits within a concave-shaped notch, *e*, in the outer peripheral surface of a rotatable locking device, G, on the corresponding side of the other half-coupling. These locking side arms, E, and rotatable locking devices G are arranged, respectively, on reverse sides of the two half-coupling heads B B—that is to say, the one side arm E on the right-hand side of the one head B and the other side arm E on the left-hand side of the other head B, and the rotatable locking devices G G with which said side arms engage on reverse sides of the heads B B to match. Furthermore, each coupling-head B is provided with lugs or guides $ff$ on reverse sides of a central line or plane intersecting the coupling-head longitudinally between the side arm, E, and rotatable locking device G carried by said head, so that when the two half-couplings are dropped or brought together the side arm, E, of either coupling-head will be in a proper engaging plane with the rotatable locking device G on the other coupling-head.

Each notched rotatable locking device G is fitted to rotate upon a side stud, $g$, on either head B, and has its center of motion a little below the longitudinal center of the head. The rotatable locking device is held on the stud by a nut and washer, H, and is made with a reduced inner neck portion, around which and within a recess in the head B is a coiled spring, $h$, attached at its one end to the rotatable locking device and at its other end to said head, and having its tension arranged so as to turn the rotatable locking device and hold it in its locking position with its notch $e$ downward and having the nose $d$ of the side arm, E, of the other head or half-coupling in locked engagement with it.

While it is preferred to combine with either rotatable locking device G a spring, $h$, as described, said spring might be dispensed with. The rotatable locking device G is turned into its receiving position with the engaging side arm of the other half-coupling, and so that the notch $e$ of the rotatable locking device will occupy a raised position, by means of a finger-piece, $i$, on the rotatable locking device. When the rotatable locking device G is in its locking position, a lip, $k$, on it comes in contact with a stop, $l$, on the head B to correct the further movement of the rotatable locking device.

The general operation will be best described by reference to the diagram shown in Fig. 5, which represents two views showing different locking positions of the rotatable locking device G. Thus in both of these views the line $a'a'$ indicates the longitudinal or central axial line of either head B, and the lines $b'b'$ the meeting lines or planes of the elastic packings or rings D D, the point $c'$ indicating the lowest part of the same, or center from which said rings work when the coupling is being closed or opened, the line $d'$ indicating the arc described. The point $e'$ corresponds with the axial center of the rotatable locking device G, and the dotted line $f'$ the arc described by the lowest or innermost point of the notch $e$ in or during the movement of the rotatable locking device G. Now, supposing the two half-couplings to be disengaged and raised and the rotatable locking device G to be turned by the finger-piece $i$ so that its notch $e$ occupies the uppermost position shown for it in either of the views in the diagram, Fig. 5—that is, either the one at the right hand or at the left hand of said figure—then the knob $d$ of either side arm, E, will drop into said notch of its respective rotatable locking device, and the weight or sagging down of the coupling-sections will cause either rotatable locking device G to be rotated till the innermost point of its notch $e$ comes either a little above or a little below the axial central line, $a'a'$, of the heads B B when closed. This may be done by simply dropping the open coupling-sections and depending upon their weight to turn the rotatable locking device, assisted by the tension of their springs $h$, where springs are used. The innermost point of the notch $e$ in the rotatable locking device and knob $d$ of the side arm, E, engaging therewith, will then move in the arc described by the dotted line $f'$, which, being of shorter radius than that of the arc $d'$ from the working center $c'$ of the elastic rings in closing, will cause the elastic rings D D to be compressed between where the two arcs $f'$ and $d'$ intersect each other, thus making the joint between the two closed half-couplings a close one; and as the rubber rings will spring back again after the innermost point of the notch $e$ in either rotatable locking device (having passed the culminating-point) reaches its lowermost position, and so that a straight line, $g'g'$, intersects the innermost point of the notch and center $e'$ of the rotatable locking device, either side arm, E, will be securely locked in its notched rotatable locking device against accidental disengagement; but in case of the cars separating, the straightening of the hose-connections will provide for the automatic disengagement of the two half-couplings.

When it is desired to provide against escape of fluid, gas, or vapor from the hose-coupling when the coupling is disengaged, each half-coupling may be provided with a valve, I, that is self-opening when the coupling is engaged, but that is closed by the pressure at its back when the coupling is disengaged; or the coupling-sections may be fitted with a reversely-operating valve when the hose-pipe coupling is designated to be used in connection with a vacuum; but, these being common to other pipe or hose-pipe couplings, no minute description of them here is necessary.

Having thus described my invention, what I claim as new, and desire to secure by Letters Patent, is—

1. In a hose-pipe coupling for railroad-cars and other purposes, the two half-couplings provided each with a locking side arm on opposite sides, respectively, of said half-couplings, and with a rotating notched locking device on reverse sides of the half-couplings to those occupied by the side arms and adapted to engage with the side arms, substantially as specified.

2. The combination, with the head or body portions B B of the two half-couplings and the facially-projecting elastic packings or rings D D, of the forwardly-projecting side arms, E E, arranged on opposite sides of the two half-couplings, respectively, and constructed with engaging nose ends $d$, and the rotatable notched locking devices G G on reverse sides of the half-couplings to those occupied by the side arms, essentially as shown and described.

3. The combination, with the head or body portion B of either half-coupling and the facially-projecting elastic packing or rings D D and locking side arms, E, of the rotatable notched locking device G on either half-coupling, and the spring $h$, controlling said rotatable locking device, substantially as specified.

DAVID HENNESSY.

Witnesses:
A. GREGORY,
C. SEDGWICK.